United States Patent
Weston et al.

(10) Patent No.: US 7,969,510 B2
(45) Date of Patent: Jun. 28, 2011

(54) VIDEO PROCESSING SYSTEM AND METHOD WITH RECURSIVE AND NON-RECURSIVE FILTERING IN SEPARATE HIGH FREQUENCY BANDS

(75) Inventors: Martin Weston, Petersfield (GB); Avigdor Steinberg, Petersfield (GB)

(73) Assignee: Snell Limited, Hampshire (GB)

( * ) Notice: Subject to any disclaimer, the term of this patent is extended or adjusted under 35 U.S.C. 154(b) by 1636 days.

(21) Appl. No.: 10/520,945

(22) PCT Filed: Jul. 14, 2003

(86) PCT No.: PCT/GB03/03050
§ 371 (c)(1), (2), (4) Date: Nov. 4, 2005

(87) PCT Pub. No.: WO2004/008741
PCT Pub. Date: Jan. 22, 2004

(65) Prior Publication Data
US 2006/0109383 A1 May 25, 2006

(30) Foreign Application Priority Data
Jul. 12, 2002 (GB) .................................. 0216257.6

(51) Int. Cl.
H04N 5/21 (2006.01)
H04N 5/213 (2006.01)
(52) U.S. Cl. .................. 348/606; 348/607; 348/625
(58) Field of Classification Search .................. 348/241, 348/252, 606, 607, 618–620, 625, 701; 345/611; 382/260–266, 274, 275
See application file for complete search history.

(56) References Cited

U.S. PATENT DOCUMENTS

| | | | |
|---|---|---|---|
| 4,058,836 A | | 11/1977 | Drewery et al. |
| 4,194,219 A | | 3/1980 | Drewery |
| 4,896,152 A | * | 1/1990 | Tiemann ............... 340/855.7 |
| 4,954,894 A | | 9/1990 | Kitaura |
| 5,442,462 A | * | 8/1995 | Guissin ............... 358/463 |
| 5,502,489 A | * | 3/1996 | Kim et al. ............... 348/607 |

(Continued)

FOREIGN PATENT DOCUMENTS
EP 0 147 073 7/1985
(Continued)

OTHER PUBLICATIONS

Campisi P, et al, "Signal-Dependent Film Grain Noise Generation Using Homomorphic Adaptive Filtering", IEE Proceedings: Vision, Image and Signal Processing, Institution of Electrical Engineers, GB, vol. 147, No. 3, Jun. 23, 2000, pp. 283-287.

(Continued)

Primary Examiner — Victor Kostak
(74) Attorney, Agent, or Firm — Pearl Cohen Zedek Latzer, LLP (57) ABSTRACT

A video noise reducer divides a signal into spatial frequency bands and derives both recursively and non-recursively filtered signals for each band. Both signals are processed nonlinearly. These signals are combined in ways that vary between the bands to provide a noise signal and a detail signal. A clean video signal with all noise removed is used in the recursive loop. The output signal includes detail enhancement and may have a subjectively pleasant amount of noise added back.

25 Claims, 9 Drawing Sheets

U.S. PATENT DOCUMENTS

| | | | |
|---|---|---|---|
| 5,903,680 A | | 5/1999 | De Haan et al. |
| 6,067,125 A | | 5/2000 | May |
| 6,633,683 B1 | * | 10/2003 | Dinh et al. .................. 382/260 |
| 7,098,957 B2 | * | 8/2006 | Kim et al. .................. 348/452 |
| 7,145,607 B1 | * | 12/2006 | Hui .............................. 348/607 |
| 2002/0094130 A1 | * | 7/2002 | Bruls et al. .................. 382/261 |
| 2004/0202245 A1 | * | 10/2004 | Murakami et al. ............ 375/240 |

FOREIGN PATENT DOCUMENTS

| | | |
|---|---|---|
| EP | 0 314 269 | 9/1994 |
| EP | 0 893 024 | 6/2000 |
| GB | 2370937 | 7/2002 |

OTHER PUBLICATIONS

Yan J C K, et al., "Film Grain Noise Removal and Generation for Color Images", Acoustics, Speech and Signal Processing, 1998. Proceedings of the 1998 IEEE International Conference on Seattle, WA, USA May 12-15, 1998, New York, NY, USA, IEEE, US, May 12, 1998, pp. 2957-2960.

International Search Report of PCT/GB03/03050 dated Apr. 26, 2004.

UK Search Report of GB 0216257.6 under Section 17 of the Patents Act 1977, dated Jan. 7, 2003.

* cited by examiner

VIDEO PROCESSING SYSTEM AND METHOD WITH RECURSIVE AND NON-RECURSIVE FILTERING IN SEPARATE HIGH FREQUENCY BANDS

CROSS-REFERENCE TO RELATED APPLICATIONS

This application is a National Phase Application of PCT International Application No. PCT/GB2003/003050, International Filing Date Jul. 14, 2003, claiming priority of Great Britain Patent Application, 0216257.6, filed Jul. 12, 2002, which are both incorporated by reference herein in their entirety.

FIELD OF THE INVENTION

This invention concerns the processing of video signals to change their subjective quality or to make them more amenable to other processes such as compression.

BACKGROUND OF THE INVENTION

The reduction of noise in video signals, either by reducing the spatial bandwidth, or by averaging stationary objects over several different temporal samples, is well known. These processes have been found not only to enhance the subjective appearance of pictures but also to facilitate the data compression of video by removing less-visually-significant information prior to the compression process.

A commonly-used technique is to combine the video signal from a point in a current frame with the signal from a corresponding point in a previous frame or frames. This is usually implemented as a recursive (IIR) filter, which may be motion compensated, where the recursion coefficient is varied in response to a motion dependant control signal. Stationary areas may be averaged over several frames, whereas moving areas may not be averaged at all.

A known implementation of this technique is to subtract two consecutive frames to obtain a signal containing noise and motion; this signal is passed through a non-linear function which attenuates small signals but allows large signals to pass. The output of the non-linear processing is then added to the earlier frame to obtain a noise-reduced output. In this arrangement the instantaneous gain of the non-linear process effectively controls the degree of recursion. When the instantaneous gain is zero the previous frame is output; and when the gain is unity the added previous-frame information is cancelled by the subtracted previous-frame information, and the processing has no effect. Usually the shape of the non-linearity, and hence the gain characteristic, is varied in response to a motion adaptation signal so that minimal processing is applied in moving areas.

In spite of this adaptation, the performance may not be adequate in moving areas and a further adaptation to a non-recursive, spatial bandwidth reduction noise reducer may be used. Typically this spatial processing "cores" the high-frequency content of the signal by attenuating low amplitude components (which are mainly noise), whilst allowing larger high frequency components to pass.

Where video images have been derived from film, the grain of the film may be a subjective impairment and these known video noise reduction techniques may be used to make it less objectionable. However, film grain is a contribution to the well-recognised and appreciated "film-look" and removing it by these prior art methods sometimes leads to subjectively unacceptable results.

SUMMARY OF THE INVENTION

The inventors have devised a novel and flexible method of video processing which can be used to modify video material to achieve one or more of the following:
Reduction of video noise
Improvement in the subjective appearance of film grain
Compression pre-processing
Alteration of the spatial frequency response of moving pictures to provide equalisation of distortions or subjective enhancement.

BRIEF DESCRIPTION OF THE DRAWINGS

An example of the invention will now be described with reference to the drawings in which.

DETAILED DESCRIPTION OF THE INVENTION

Accordingly, the present invention consists, in one aspect, in a video process in which spatially co-sited information from different temporal samples is recursively combined, wherein the signal is decomposed into a low frequency band and at least two high frequency bands, and both recursive non-linear processing and non-recursive non-linear processing is carried out in each high frequency band.

Advantageously, the non-linear processing comprises a gain dependent on processed signal amplitude.

Preferably, the input video signal, a recursive signal and a non-recursive signal are combined to derive separate noise reduced and noise corrected signals; the noise reduced signal being utilised in said recursion and said noise corrected signal being output.

Suitably, there is variation between high frequency bands of the relative contributions of the recursive signal, the non-recursive signal and input video signal in the noise reduced signal and wherein there is variation between high frequency bands of the relative contributions of the recursive signal, the non-recursive signal and input video signal in the noise corrected signal.

In another aspect, the present invention consists in video process in which spatially co-sited information from different temporal samples is recursively combined, wherein the combination varies in dependence upon spatial frequency, there being at least three spatial frequency bands, with a different combination in each of the three bands.

Advantageously, recursive and non-recursive filtering is combined.

Preferably, one or more non-recursively separated detail components is combined with the video signal. These detail components may serve to enhance or to de-enhance usually high frequency picture elements.

Suitably, one or more noise components are removed from one or more non-recursively separated detail components and the resulting noise-reduced detail is combined with the video signal.

In yet a further aspect, the present invention consists in video processing apparatus comprising a filter structure serving to divide an input video signal into at least two high frequency bands; at least one recursive loop providing for the recursive combination in each band of spatially co-sited information from different temporal samples; a non-linear processor operating on a non-recursive signal in each band and a combiner serving to generate through parameterised combination of input video signal, recursively combined video signal and non-linearly processed signal, both a noise reduced signal for the or each recursive loop and a noise corrected signal for output.

Advantageously, the combiner serves to generate a detail correction signal and a noise signal, the noise reduced signal being formed by subtraction of the noise signal from the input signal and the noise corrected signal being formed by weighted linear combination of the detail correction signal, the noise signal and the input signal.

Preferably, there is variation as between the bands for at least one of:
 the weighting coefficients applied respectively to the detail correction signal, the noise signal and the input signal;
 the characteristic of said non-linear processor; and
 the recursive combination.

Suitably, the non-linear processor serves to pass differentially low amplitude signals expected to contain noise.

In still a further aspect, the present invention consists in a video process comprising the steps of dividing an input video signal into at least two high frequency bands; deriving for each band a recursively filtered signal and a non-recursively filtered signal; combining the input video signal, the recursively filtered signal and the non-recursively filtered signal to derive separate noise reduced and noise corrected signals; utilizing the noise reduced signal in said recursive filtering and outputting said noise corrected signal.

Advantageously, there is variation between frequency bands of at least one of: the recursion constant, the characteristic of the non-recursive filtering input video signal, the relative contributions of the recursively filtered signal, the non-recursively filtered signal and input video signal in the noise reduced signal and the relative contributions of the recursively filtered signal, the non-recursively filtered signal and input video signal in the noise corrected signal.

Preferably, the process comprises the further step of deriving a detail corrected signal and outputting a noise and detail corrected signal.

Suitably, there is variation between frequency bands of the contribution of the detail corrected signal to the noise and detail corrected signal that is output.

Embodiments of the present invention offer important advantages. The ability to vary the degree of recursion between different spatial frequency bands enables the maximum benefit to be obtained from temporal noise reduction, consistent with avoiding impairment. The variation between spatial frequency bands of other parameters such as a filter characteristic or weighting coefficients (either alone or in combinations with or without variation in the degree of recursion) enable noise control and optionally detail control to be tailored to the spatial frequency spectrum to produce the desired subjective effect. The creation of a noise-reduced signal for use in the recursive loop, which is different from the output signal, has important benefits. In appropriate circumstances, and in amounts varying with frequency, amounts of noise can be added to the output signal whilst keeping "clean" the recursive signal loop. This addition of noise may (band by band) comprise the adding back of a portion of removed noise or the addition of synthesized noise. Similarly, a detail control signal may be included in the output signal whilst keeping the recursive loop clean.

Figure 1:
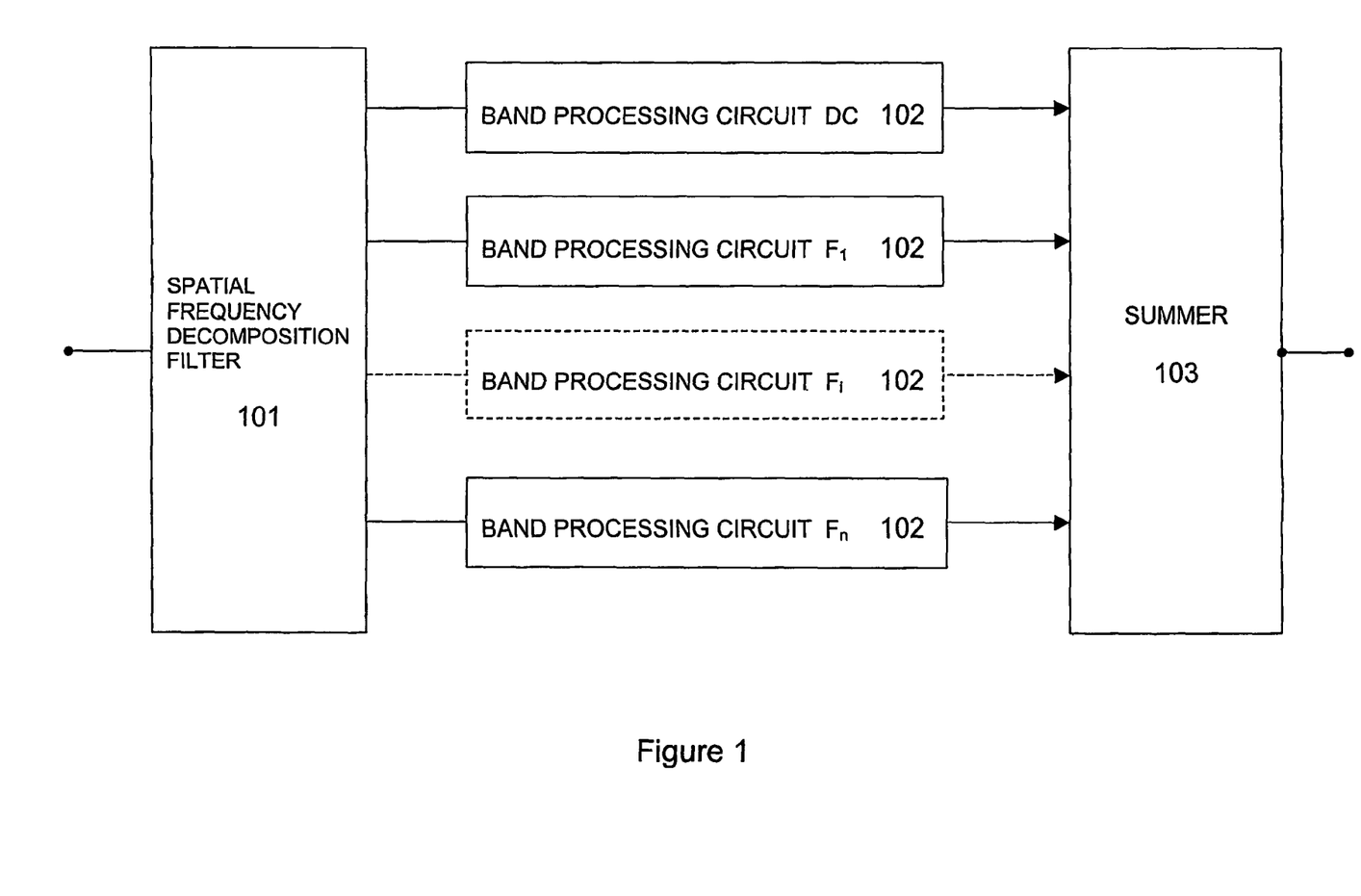
FIG. 1 shows a block diagram of video processing apparatus according to a first embodiment of the present invention.

Referring initially to FIG. 1, there is shown a diagrammatic overview of video processing apparatus according to a first embodiment of the present invention.

An input video signal is received at spatial frequency decomposition filter (101) and decomposed into a low frequency band (or DC) at least two—and preferably at least seven—high frequency bands. These are—typically—two-dimensional frequency bands and a preferred band configuration will be described later. In some applications, a one-dimensional band will be appropriate. Each band passes to a respective band processing circuit (102) with the bands being summed in summer (103) to generate a processed video signal output. Typically this output signal will be noise reduced or noise corrected and may also be detail corrected.

The band processing circuits for frequency bands $F_1$ to $F_n$ will generally have the same structure but may vary from band to band in the choice of various parameters. The DC band processing circuit will generally have a simpler structure.

Figure 2:
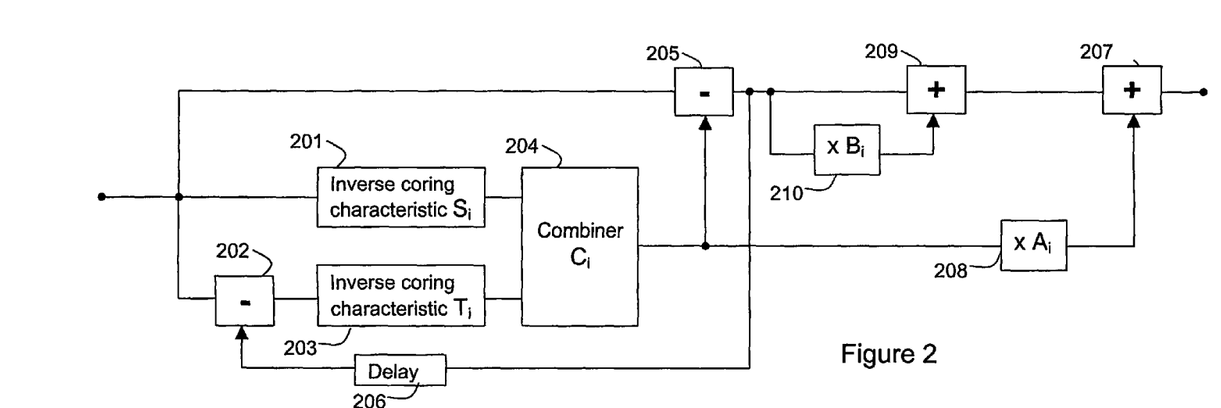
FIGS. 2 and 3 show in more detail component parts of the apparatus shown in FIG. 1.
Figure 6:
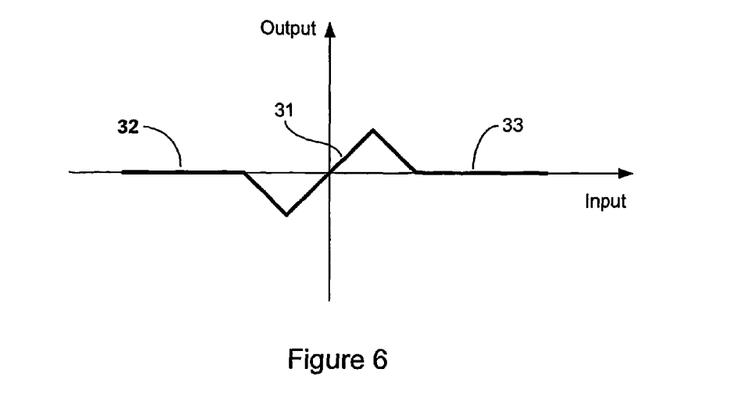
FIG. 6 shows a non-linear transfer characteristic.

Referring now to FIG. 2, there is shown the band processing circuit for frequency band $F_i$. The input band signal passes directly to a first inverse coring block (201) and via a subtractor (202) to a second inverse coring block (203). The first inverse coring block (201) has a characteristic $S_i$. This may typically take the form shown in FIG. 6 and is described in more detail subsequently. The characteristic may vary between bands in—for example—the amplitude thresholds. The second inverse coring block (203) has a characteristic $T_i$; this may take the same general form as characteristic $S_i$.

The outputs of the inverse coring blocks are combined in combiner (204), with the output of combiner (204) being subtracted at (205) from the input band signal. The output of the subtractor (205), taken through a picture delay (206) forms the inverting input to subtractor (202).

The operation of this portion of the band processing circuit can now be understood. The outputs of the inverse coring blocks (201, 203) may be regarded as noise signals formed in non-recursive and recursive manner, respectively. The inverse coring block (201), operating on a non-recursive signal, separates low amplitude signals, presumed to be noise. This presumption will be the more correct, the lower the amount of detail in the signal. The inverse coring block (203) operates on a recursively-combined signal, that is to say a combination of spatially co-sited information from different temporal samples. The presumption that the output of inverse coring block (203) is noise will be the more correct the less motion there is represented in the video signal.

The combiner (204) derives a single noise signal for the band by—for example—forming a weighted sum of the recursive and non-recursive noise signals. It will be understood that the weighting applied to either signal may at times be zero, resulting in the selection of the other signal. The combiner may additionally amplify or attenuate. Alternatively, the combiner may operate in non-linear fashion to select—for example—the larger or the smaller of its inputs. More generally, the combiner may derive its output in dependence, pixel-by-pixel, on the values of the input signals to be combined. In a modification, the functions of the inverse coring units (201, 203) are folded into that of the combiner (204).

It is important to note that the recursive loop contains a noise-reduced signal resulting from subtraction of the current best estimate of noise, from the input signal. This noise-reduced signal may not subjectively be the best output signal but it nevertheless represents, the cleanest signal to drive the recursion.

There are diverse reasons why the noise-reduced signal may not subjectively be, the best output signal in the particular band. It may for example be preferable to preserve a "film look" by not removing film grain. For this or other reasons it will often be appropriate to add back a proportion of the removed noise. This is achieved through adder (207) and multiplier (208). The gain $A_i$ of the multiplier represents the proportion of detected noise that is added back and will vary from band to band. In some cases, it will be appropriate to accentuate noise in a certain band by selecting a gain of greater than unity.

Another reason why the simple, noise-reduced signal may not the subjectively optimum output signal is that detail enhancement may be required. Adder (209) and multiplier (210) provide for the addition of a proportion of the band signal to emphasize, particularly, higher spatial frequencies. In many cases, improved noise reduction enables a higher degree of detail enhancement than would otherwise be possible.

It will be recognised that the inverse coring unit (203) operating on the recursive filter, serves to reject signals likely to result from motion. In a variation, other techniques may be employed for introducing motion adaptation into the recursion and separating noise from motion. Examples of such techniques are disclosed in U.S. Pat. Nos. 4,058,836 and 4,194,219, both of which are incorporated herein by reference. Another technique involves dynamic variation of the inverse coring characteristic $T_i$. An alternative to motion adaption of the temporal recursion is motion compensation, as described later.

Figure 3:
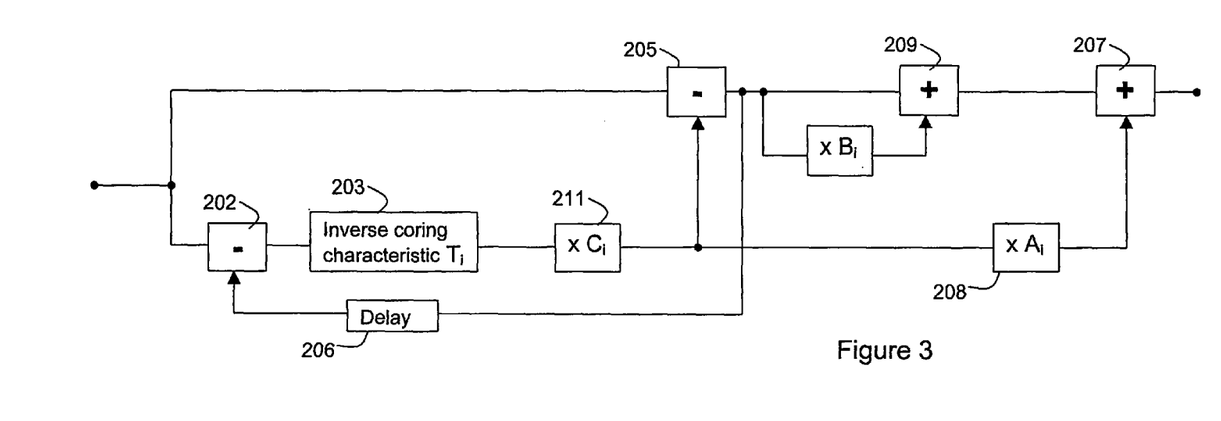

The band processing circuit for DC is shown in FIG. 3, where like components have been given the same reference numerals as in FIG. 2. It will be seen that the inverse coring circuit (201) is omitted and the function of combiner (204) is replaced by a multiplier (211).

It will be recognised that the inverse coring blocks (201, 203) are examples of a variety of non-linear processors suitable for use in this embodiment of the invention. The separate provision in each band of—typically—an amplitude dependent gain for both the recursive and non-recursive signals, provides for noise reduction which is elegantly responsive to the spatial frequency spectrum of the video.

Figure 4:
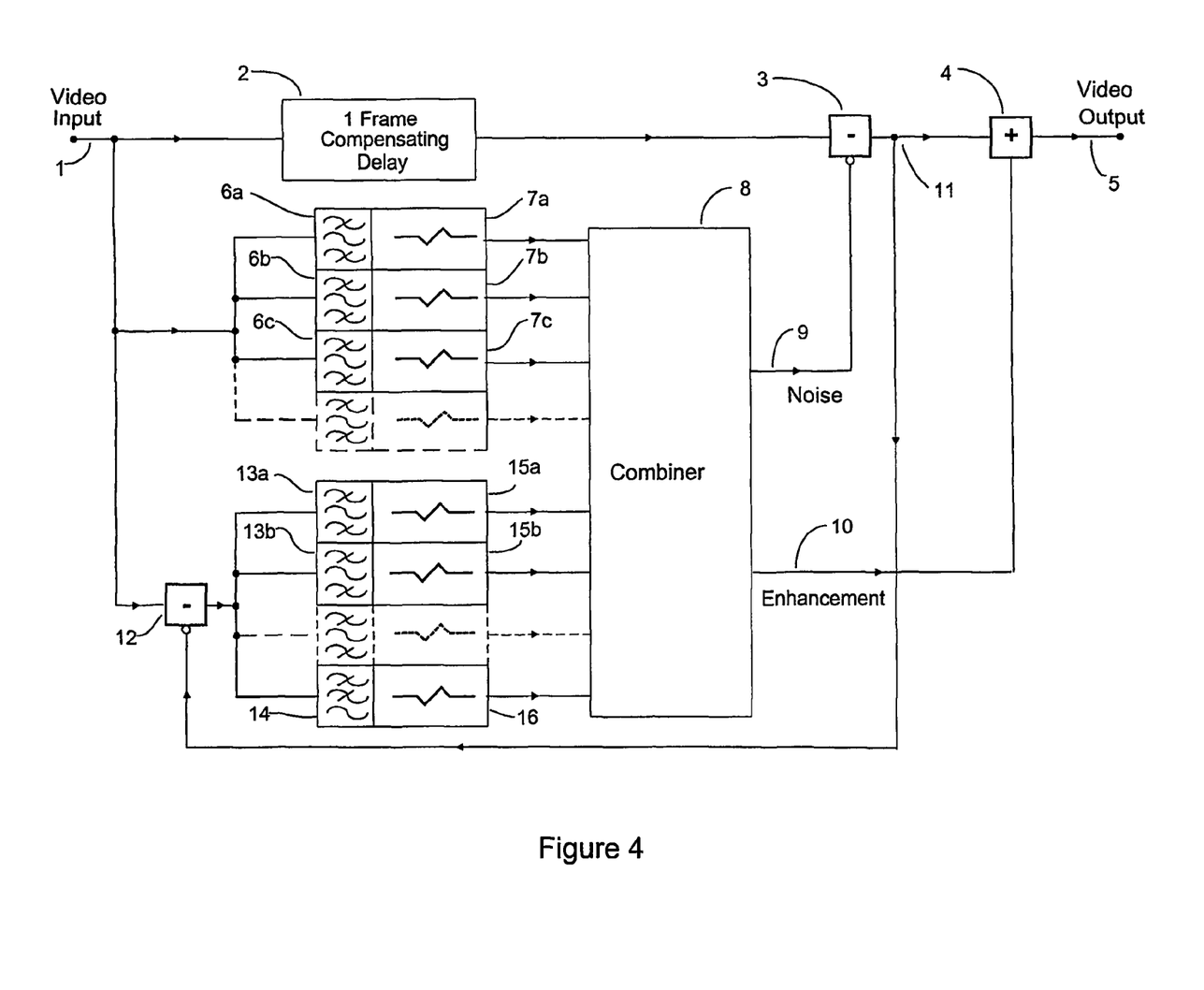
FIG. 4 shows a video processing system in accordance with a second embodiment of the invention.

Reference is now directed to FIG. 4, which shows video processing apparatus according to a second embodiment of the invention.

A video input (1) feeds a one-frame compensating delay (2), the delayed output feeds a subtractor (3), whose inverting input is driven by noise which has been extracted from the signal by methods which will be described below. The noise is co-timed with the video so that the output of the subtractor (3) is a noise-reduced signal. This is combined in an adder (4) with an image enhancement signal (also to be described below) and forms the video output from the process (5).

Figure 5:
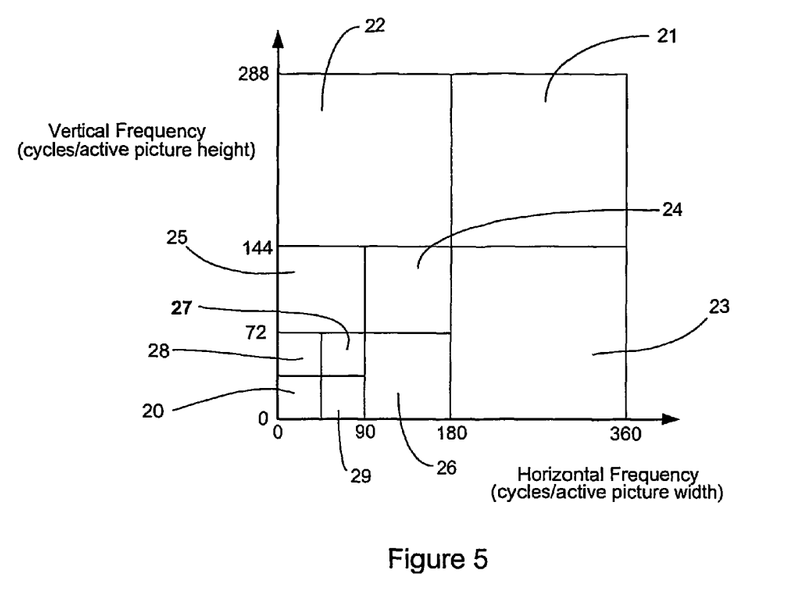
FIG. 5 shows an arrangement of spatial frequency bands.

The input signal (1) also feeds a bank of spatial filters (6a), (6b) etc. These may be band-pass or high-pass, and are chosen to decompose the higher frequency part of the signal spectrum into a number of separate frequency bands. A typical arrangement of frequency bands is shown in FIG. 5. This figure shows nine two-dimensional frequency bands (21), (22) ... (29) which can be filtered from a video signal having 576 active lines and 720 horizontal samples per active line. (Note that nine filters (6) in FIG. 4 are required to implement this arrangement; the low-frequency band (20) does not have a corresponding filter (6) in FIG. 4.) The frequency bands should tessellate and the filter characteristics should be "complementary" so that if the filtered outputs, and the low frequency band (20), are added together the original signal is reconstructed, substantially without distortion. Examples of suitable filtering methods will be described below.

If the video is interlaced it will be necessary to use lines from both fields in order to separate the higher vertical-frequency bands (21) and (22). This is undesirable unless the signal is derived from film (or some other process in which the temporal sampling rate is nearer the picture rate than the field rate); for true interlaced video the bands (21) and (22) would not normally be used. Each of the filters (6) in FIG. 4 (there will be nine filters to implement the arrangement shown in FIG. 5) feeds a respective "inverse-coring circuit" (7a), (7b) etc. These have a transfer characteristic of the form shown in FIG. 6. Referring to this Figure, the characteristic has a linear region (31) where small input signals are passed transparently, and low-gain regions (32) and (33) where larger-amplitude positive and negative inputs are attenuated.

Returning to FIG. 4, the outputs of the non-linear circuits (7) are fed to a linear combiner (8), which also receives the outputs of the filters (6) directly, without the application of inverse coring. The combiner forms two different weighted combinations of its input signals; one combination (9) is optimised to separate the noise from the input signal, and the second combination (10) is optimised to separate high-frequency detail from the input signal.

The propagation delay of the filters (6) in FIG. 4 is made equal to one—frame (this will usually require additional delay elements, not shown in the Figure) so that detail and noise signals (9) and (10) are co-timed with the output from the compensating delay (2). The noise can then be subtracted (3) to give a noise-reduced signal (11), and the detail can be added (4) to give a noise-reduced and detail-enhanced video output (5).

The processing described so far is purely spatial in character and it is known that spatial noise-reduction can cause undesirable artefacts when a high degree of noise reduction is applied. The system described above minimises these artefacts by applying different levels of noise reduction in the different frequency bands, but further improvement is possible by making use of temporal recursion, as will now be described.

The noise-reduced signal (11) is subtracted (12) from the input signal (1). These signals are separated in time by one frame, because of the compensating delay (2), and so, in the absence of movement, the difference comprises only noise. The difference signal is passed to a second set of band splitting filters (13a), (13b) etc., and (14). These filters separate the signal into a number of bands in a similar way to the filters (6); however, a low pass filter (14) is included in this case.

The separated bands, including the low-frequency band, are processed in an array of inverse-coring circuits (15a), (15b), etc., and (16) which operate in the same way as the blocks (7) to attenuate all except the small signal components. The filtered, inverse-cored signals are fed to the combiner (8) where they are linearly combined with the signals from the blocks (7) to create the separated-noise signal (9).

The propagation delay of the filters (15) and (16) is arranged to be one frame (by adding compensating delays, not shown in the Figure, if necessary) so that the filtered contribution from the input signal (1) via the subtractor (12)) arrives at the output of the combiner (8) co-timed with the output of the compensating delay (2).

By selecting appropriate weighting factors in the combiner (8) to generate the noise signal (9) both recursive and non-recursive noise reduction of the video signal can be achieved. Generally when both the recursive and non recursive contributions from the same frequency band are used care is necessary to ensure that the corresponding signal weighting factors sum to unity, so that the band in question is not unduly emphasised or de-emphasised. The optimisation of the contributions will depend on the nature of the wanted signal and the noise; as well as adjusting the combiner (8) it may be advantageous to alter the size of the linear regions of each of the blocks (7), (15) and (16) depending on the level of noise in the respective frequency bands.

The optimisation of the recursive contributions to the noise signal (9) should also take account of "shot-changes" and the like. If there were no contributions from the blocks (7), one frame after a discontinuity there will be similar levels of noise at both input to the subtractor (12); optimum noise reduction is then achieved when the gain of the route from the output of the subtractor (12) to the negating input of the subtractor (3) is one half. This will give a 3 dB noise improvement because the current field is effectively averaged with the previous field (as far as small signal components are concerned). One frame later, this noise improvement will be apparent on the signal (11) fed back to the subtractor (12), and its output will better correspond to the noise at the output of the delay (2); the corresponding optimum gain is then two thirds and the noise improvement is then 5 dB. For subsequent frames the sequence of optimum gain values is . . . ¾, ⅘, etc. This is analogous to the process described in European Patent EP 0 893 024 B1

In practice better noise reduction than this will be achieved because the contributions from the blocks (7) to the noise signal (9) will ensure that there is less noise on the feedback signal (11), and so a higher degree of recursion is possible with consequent improved noise reduction.

A further improvement is possible by motion compensating the recursion. This can be done by connecting a motion measurement system to the input (1). The measured motion is used to derive motion vectors which are used to shift the pixels of the signal at the subtracting input of the subtractor (12). This signal is one frame earlier than the input (1) and the vectors move the pixels to cancel the effect of movement between the input frame and the preceding frame, thus allowing the two frames to be combined without blurring.

Figure 7:
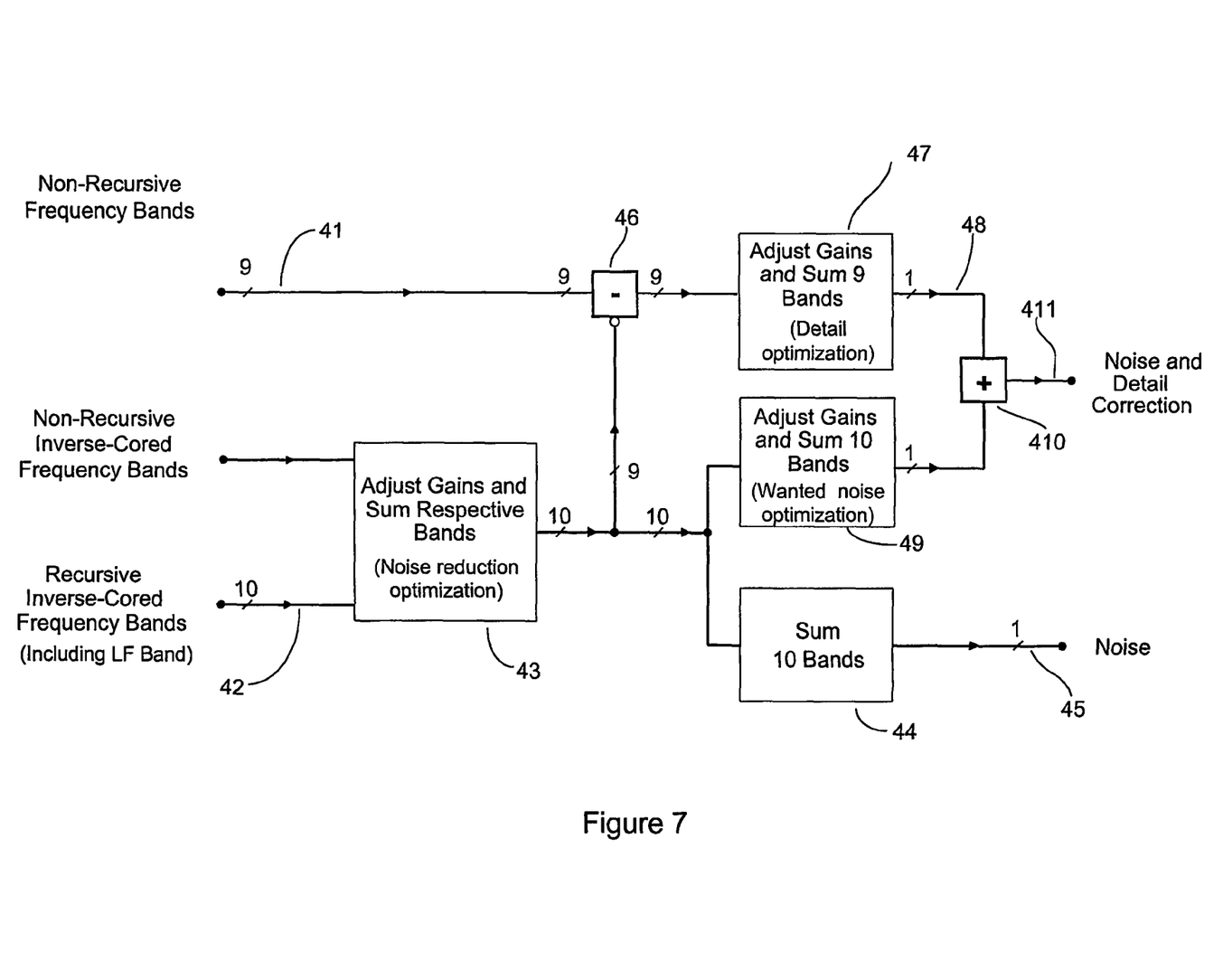
FIG. 7 shows a noise and detail processor.

FIG. 7 shows a possible implementation of the block (8).

FIG. 7 has three sets of input signals. A first set of nine inputs (40) are the unprocessed outputs of the filters (6) in FIG. 4.

A second set of nine inputs (41) are inverse-cored sub-bands separated from the video input (i.e. the outputs of the blocks (7) in FIG. 4); a third set of ten inputs (42) are inverse-cored sub-bands separated from the difference between the input video and the noise-reduced video of the preceding frame (i.e. the outputs from the blocks (15) and (16) in FIG. 4). Typically the bands would be as shown in FIG. 5, although other arrangements and numbers of bands are not ruled out. Nine of the input bands (42) cover the same respective spectral areas as the input bands (40 and 41); the tenth of the inputs (42) covers the low frequencies not included in the other bands.

A gain adjustment block (43) individually adjusts the gains of each of the 19 inputs (41) and (42), and sums together corresponding bands from the two groups of inputs. The gain values are chosen so that when the ten outputs from the block (43) are summed in the block (44), an output signal (45) is obtained which corresponds as closely as possible to the noise content of the video signal being processed. (This is the signal (9) of FIG. 4.)

The nine high-frequency bands from the gain adjustment block (43), i.e. all except the low-frequency band, are respectively subtracted (46) from the inputs (40) to give a set of nine noise-free sub-band components which are input to a gain adjustment and summing block (47). The individual gains of the bands are chosen so that the summed signal provides a detail correction signal which will be added to the video being processed so as to achieve subjective enhancement. Usually constructive edge enhancement is required but negative gains in the block (47) could be used to de-enhance edges. Because the enhancement signal has had the noise subtracted from it, a greater degree of enhancement is possible without creating undesirable artefacts.

There are applications when the objective is not to remove all noise from a signal but to alter the characteristics of the noise—perhaps to match the noise characteristics of another signal. The outputs of the block (43) comprise a close approximation to the noise content of the input signal; fortunately this noise is presented as ten separate frequency bands, and it is therefore possible to modify the character of the noise by adjusting the gains of the individual bands before adding them together. This gain adjustment can be done in the block (49), and the resulting wanted noise can be added (410) to the detail correction signal (48) to give a combined noise and detail correction signal (411).

The output signals (45) and (411) from FIG. 7 can be used as the signals (9) and (10) respectively in FIG. 4. The detail correction and the wanted noise are not included in the recursion loop which makes them easier to optimise. However, the best possible approximation to the noise is subtracted from the video fed back into the recursion loop, thus allowing the majority of the noise on the input video to be separated and cancelled. This allows very flexible video processing where detail enhancement or de-enhancement can be adjusted independently of noise optimisation.

Clearly the effectiveness of the processing depends on the ability of the filter bands to discriminate wanted signal from noise, so that higher degrees of noise reduction can be applied in bands which contain little or no wanted signals. The arrangement shown in FIG. 5 has been found to be effective and a method of implementing the necessary band splitting, filters will now be described. For the purpose of this explanation an interlaced signal having 576 active lines, each having 720 horizontal samples, will be assumed; the skilled person would have no difficulty in adapting the methods described to other video formats.

As can be seen from FIG. 5, the frequency bands can be obtained by a hierarchical sequence of band splitting operations. First there is a vertical split at 144 cycles per active picture height (c/aph); the resulting high and low vertical frequencies are then split by horizontal filters at 180 c/apw. The lowest frequency band (nearest the origin) from this operation is then split horizontally and vertically at 90 c/apw and 72 c/aph respectively. The lowest band from this second split is then divided at 45 c/paw and 36 c/apw to derive the remaining bands. Each of these band splitting operations (both horizontal and vertical) can be accomplished by using a symmetrical, three tap transversal filter of the form shown in FIG. 8.

Figure 8A:
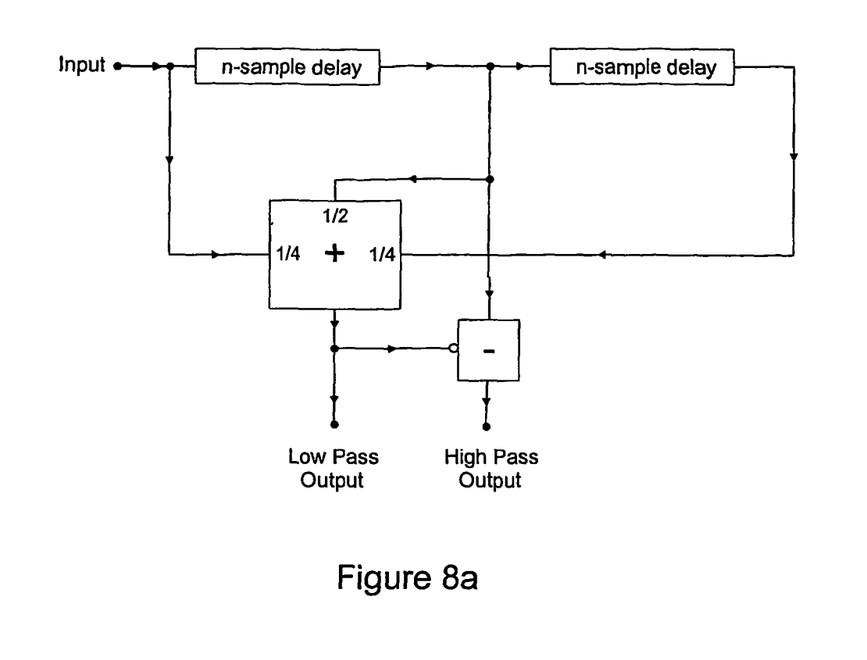
FIG. 8*a* shows a band splitting filter.
Figure 8B:
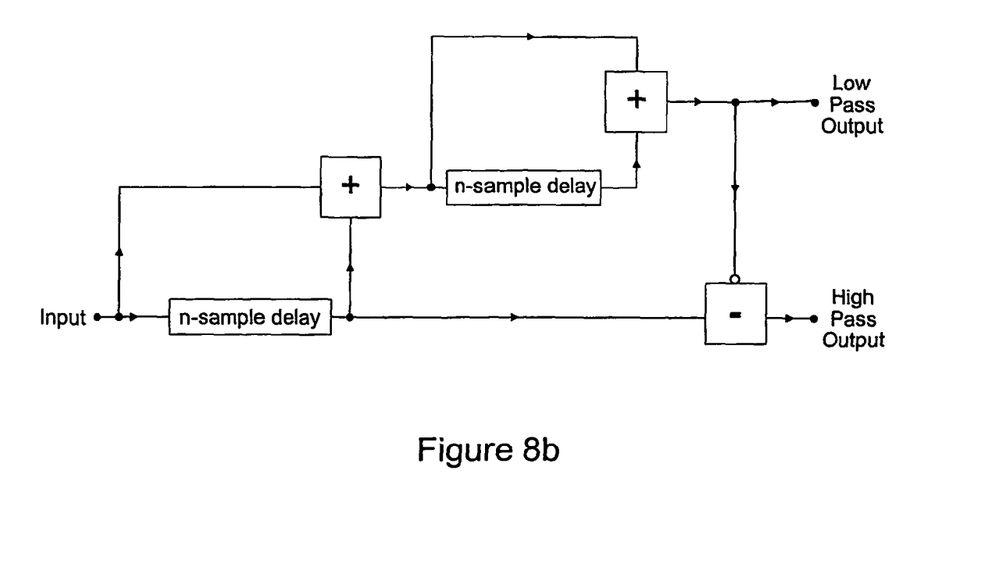
FIG. 8*b* shows an alternative structure for the filter of FIG. 8*a*.

Either the form of FIG. 8a or FIG. 8b may be used; they are equivalents. This type of filter gives a cosinusoidal frequency response and introduces no group delay distortion. The horizontal band-split at 180 c/apw shown in FIG. 6 can be obtained with a delay of one sample, the split at 90 c/apw can be achieved with a delay of two samples, and the split at 45 c/apw requires a delay of four samples.

Because the filter response is periodic, it is necessary to consider the higher-frequency repeats of the response. This is not a problem for the one-sample-delay filter as the higher order responses are above the Nyquist limit; however, in the case of the two-sample-delay filter, the effects of the higher order must be considered. Fortunately if the two filters are cascaded (with the wider band filter first) the higher-order responses of the second filter fall in the stop-band of the first filter.

Figure 9:
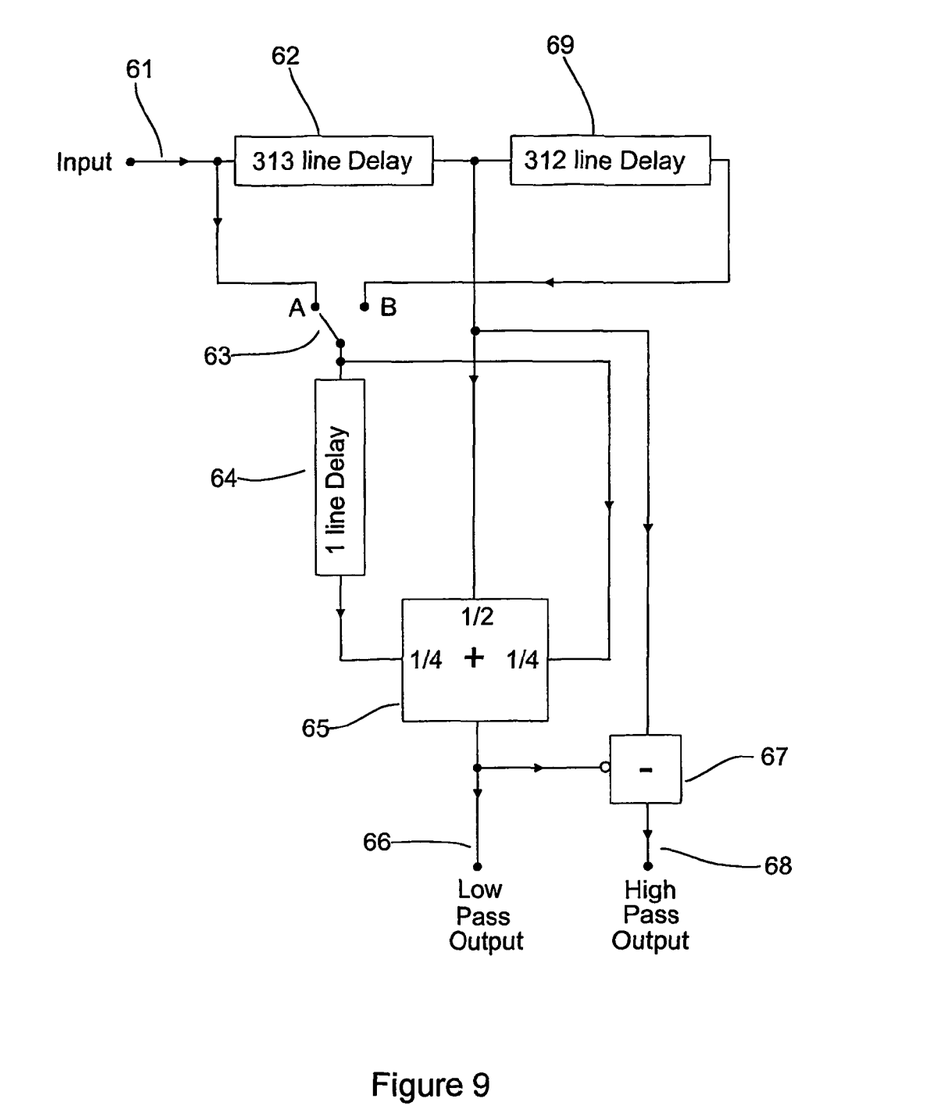
FIG. 9 shows a vertical band splitting filter.

The vertical band-split at 144 c/aph requires a delay corresponding to one line pitch. Usually the signal is interlaced and so a signal delay of about one field is required. A suitable arrangement is shown in FIG. 9. The video input (61) feeds a 313-line delay (62) and a changeover switch (63). When the switch is in the position marked A the input also feeds a one-line delay (64). The output from the 313-line delay (62) feeds a weighted-input adder (65), which combines the 313-line-delayed input (weight ½) with the undelayed input (weight ¼) and the output of the one-line delay (64) (weight ¼). The resulting output (66) forms the vertically low-pass filtered signal and corresponds to a combination of three vertically adjacent picture lines, two from the input field, and the intervening line from the previous field. This low pass output is subtracted (67) from the central line to give a high pass output (68).

The combination of lines from adjacent fields (as described above) usually gives temporal as well as spatial filtering; however if the input is derived from film (or some other source with a temporal sampling rate lower than the video field rate) it is possible to obtain purely spatial filtering by only combining lines from fields which correspond to the same point in time. In the case of film having a frame rate corresponding to the video frame rate, this is achieved by operating the switch (63) at field rate so that, when the input field (61) does not correspond to the same point in time as the output of the 313-line delay (62), the switch (63) is set to position B so that two lines from an earlier field are used. These lines are made available by the combination of the 312-line delay (69) and the one-line delay (64). (This method of processing is described in European patent EP 0 626 120.)

If the well-known 3:2 pulldown technique is used to synchronise a film frame rate lower than the video frame rate to the video frame rate, the switch (63) can be operated in a suitable pattern (such as A B B A B A B B etc.) to ensure that only time-coincident lines are combined.

Figure 10:
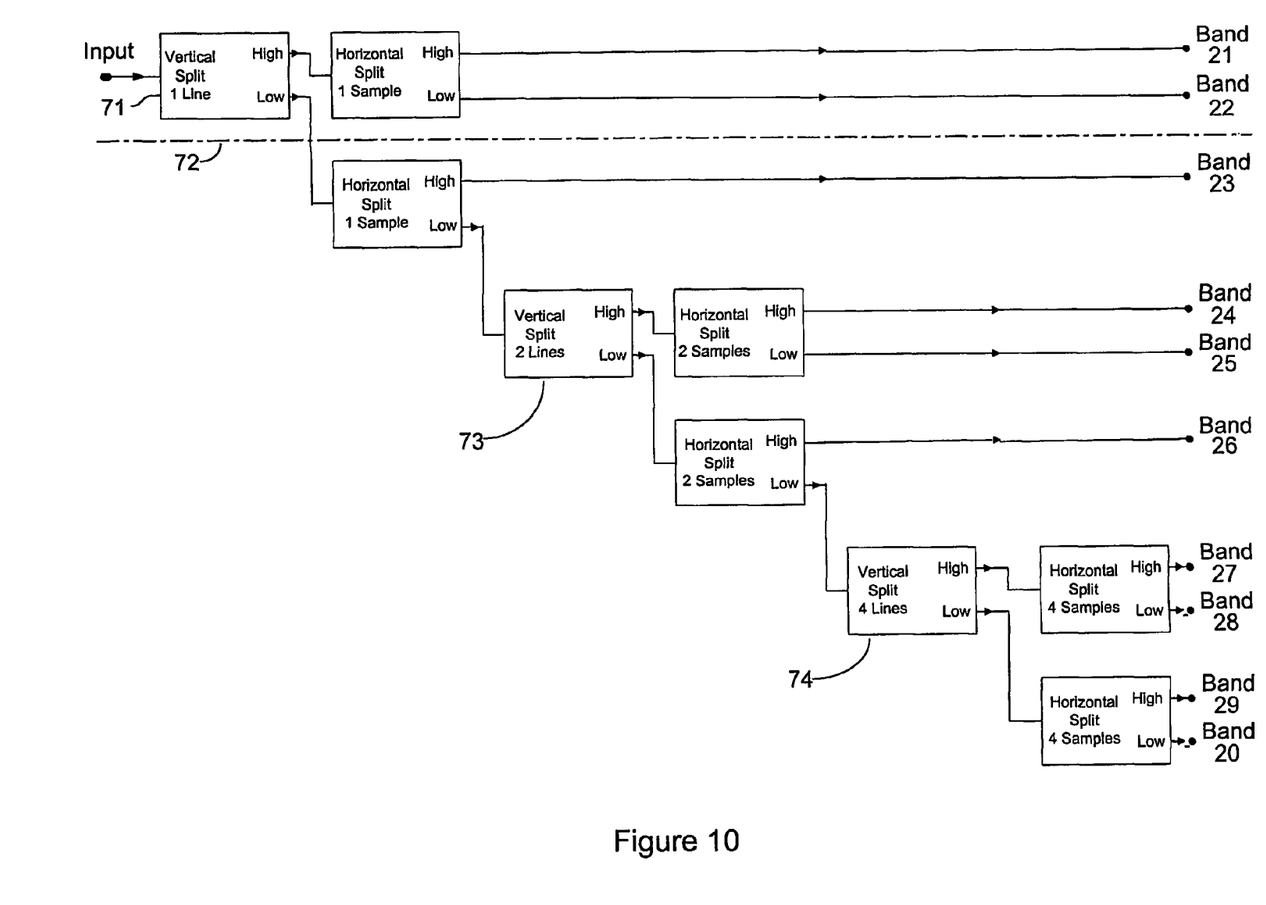
FIG. 10 shows a method of splitting the frequency bands of FIG. 5.

The complete set of bands shown in FIG. 5 can be obtained from a cascaded arrangement of vertical and horizontal spatial frequency splitting filters as shown in FIG. 10. Each of the filters sums three, differently delayed versions of its input, weighted in the proportions ¼ ½ ¼ as described above (see FIGS. 8 and 9). The relevant delay values (between the contributions which are combined in the respective filters) are shown in FIG. 10, in sample periods for the horizontal filters, and picture lines for the vertical filters. As mentioned previously, the propagation delays of all the filters must be equal to one frame and this will require compensating delays to be inserted at appropriate points; these are not shown in the Figures.

The first vertical filter (71) uses information from two fields and can use the arrangement shown in FIG. 9. However the vertical filter (73) requires a delay of two picture lines which equates to a delay of one line period, and the vertical filter (72) requires a delay of two line periods. These latter two filters can therefore use the structures shown in FIG. 8. All the horizontal filters can use the arrangement shown in FIG. 8.

As mentioned previously, compensating delays must be added to the various filtered signals so as to make the delay for each band equal to one frame. It is therefore advantageous to re-arrange the filters where possible so as to make their vertical delays equal. The processing below the line (72) in FIG. 10 uses only linear combinations of delayed signals from one field; it is therefore possible to reorder these processes, provided that the contributions to each output remain unchanged.

Figure 11:
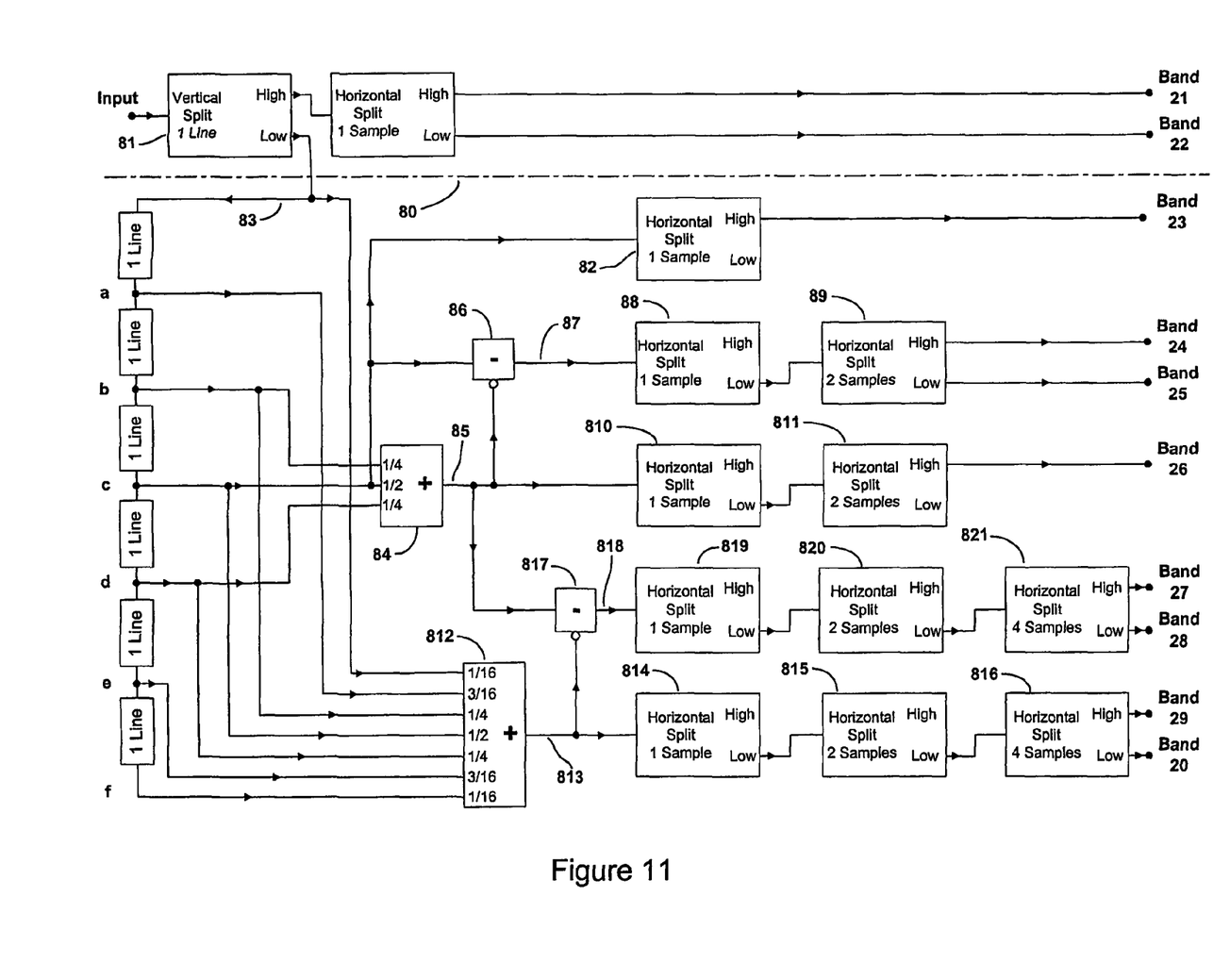
FIG. 11 shows an alternative method of splitting the frequency bands of FIG. 5.

FIG. 11 shows a rearrangement of FIG. 10 in which the bands 23 to 29 and the low-frequency band 20 are derived from a single set of six cascaded line delays. All the horizontal filters in FIG. 11 have the same structures those in FIG. 10. The vertical filter at 144 c/aph (81) is also the same as in FIG. 10; the two other vertical filters are differently structured, but achieve the same frequency responses for the various bands.

Referring to FIG. 11, the processing above the line (80) is identical to that shown in FIG. 10. The signal (83) has been vertically low pass filtered (81) (at 144 c/aph) so as to remove the bands 21 and 22. Two further vertical band splitting filters are required, one (at 72 c/aph) to separate the bands 24 and 25 (from the bands 26, 27, 28, 29 and 20), and a second filter (at 36 c/aph) to separate the bands 27 and 28 (from the bands 29 and 20).

The signal (83) is fed to six one-line-period delay lines giving delayed outputs (a) to (f) inclusive. The band 23 is obtained by high pass filtering (81) the output (c) of the third line delay.

The first vertically low-pass filtered signal is obtained by summing (84) the three-line-delayed signal (c) with the signals (b) and (d), which correspond to the succeeding and preceding lines respectively. The signals are weighted ¼, ½, ¼ as in FIG. 8. The resulting signal (85) is subtracted (86) from the central signal (c) to give a high-pass output (87) which contains bands 24, 25 and part of band 23. This is low-pass filtered (88) to leave only bands 24 and 25, which are separated (as previously described) in the horizontal filter (89).

The vertical low-pass signal (85) contains the band 26 together with both higher and lower horizontal frequency components, which are removed by the low pass filter (810) and the high-pass filter (811).

The second vertical band split must have a response equivalent to the cascading of the filters (71) and (73) in FIG. 10. This is obtained by taking an appropriate weighted sum of the signal (83) and its delayed versions (a) to (f) in the adder (812). The resulting low-pass signal (813) is vertically co-timed with the signal (c) and contains the bands 20 and 29 together with parts of the bands 26 and 23. These latter parts are removed by the low-pass filters (814) and (815). The two wanted bands are then separated by the horizontal splitting filter (816).

The low-pass output (813) of the second vertical filter is subtracted (817) from the low-pass output (85) of the first vertical filter to give the signal (818), which corresponds to the bands 27 and 28, together with parts of bands 26 and 23. These latter unwanted high-horizontal-frequency components are removed by two low-pass filters (819) and (820) before separation of the wanted bands by the horizontal splitter (821).

It can be seen that outputs of all the filters below the line (80) are arranged to be timed three field-lines after the signal (83) and so only horizontal compensating delays are required to synchronise their output bands. A single vertical compensating delay at the low-pass output of the filter (81) can be used to synchronise these bands with the bands 21 and 22.

It must be noted that the above descriptions are examples and many variations of the concept are possible. For example the number and shape of the frequency bands may differ from those shown in FIG. 6 and the invention is not limited to interlaced formats or to formats having 576 active lines and 720 samples per active line. Transversal filters with different numbers of signal contributions and weights from those shown may be used; the horizontal filters could be implemented by inductors and capacitors. Not all the high frequency bands in the recursive processing may correspond to bands in the non-recursive processing, and vice-versa. The inverse coring circuits may differ from each other, and their individual characteristics may be varied so as to optimise the performance for a particular input.

It will be understood that the above are but examples of modifications that can be made to the described embodiments without departing from the scope of the invention.

The invention claimed is:

1. A process for processing a video signal in which spatially co-sited information from different temporal samples is recursively combined, comprising decomposing the video signal into a low frequency band and at least two high frequency bands, and carrying out both recursive non-linear processing and non-recursive non-linear processing in each high frequency band, wherein the input video signal, a recursive signal and a non-recursive signal are combined to derive separate noise reduced and noise corrected signals; the noise reduced signal being utilised in said recursion and said noise corrected signal being output.

2. A process according to claim 1, wherein there is variation between high frequency bands of the relative contributions of the recursive signal, the non-recursive signal and input video signal in the noise reduced signal and wherein there is variation between high frequency bands of the relative contributions of the recursive signal, the non-recursive signal and input video signal in the noise corrected signal.

3. A process according to claim 1, comprising the further step of deriving a detail corrected signal and outputting a noise and detail corrected signal.

4. A process according to claim 3, wherein there is variation between high frequency bands of the contribution of the detail corrected signal to the noise and detail corrected signal that is output.

5. A video process in which spatially co-sited information from different temporal samples is recursively combined, comprising varying the combination in dependence upon spatial frequency, there being at least three spatial frequency bands, with different combination in each of the three bands and in which recursive and non-recursive filtering is combined, and in which one or more non-recursively separated detail components is combined with the video signal.

6. A process according to claim 5 in which one or more noise components are removed from one or more non-recursively separated detail components and the resulting noise-reduced detail is combined with the video signal.

7. A video process in which spatially co-sited information from different temporal samples is recursively combined, comprising varying the combination in dependence upon spatial frequency, there being at least three spatial frequency bands, with different combination in each of the three bands, and in which one or more detail components are separated from a video signal and combined with a noise reduced video signal.

8. A video process in which spatially co-sited information from different temporal samples is recursively combined, comprising varying the combination in dependence upon spatial frequency, there being at least three spatial frequency bands, with different combination in each of the three bands, and wherein recursively and non-recursively filtered signals are input to non-linear filters for removing specific components of the signals.

9. A process according to claim 8, wherein it is the noise component of a given signal which is filtered.

10. A video process in which spatially co-sited information from different temporal samples is recursively combined, comprising varying the combination in dependence upon spatial frequency, there being at least three spatial frequency bands, with different combination in each of the three bands and in which recursive and non-recursive filtering is combined, and wherein recursively and non-recursively filtered signals are input to band-splitting filters, and sub-bands of the recursively and non-recursively filtered signals are combined.

11. A process according to claim 10, wherein sub-bands of corresponding frequency from the respective recursively and non-recursively filtered signals are combined.

12. A process according to claim 10, wherein the set of sub-bands of the recursively and non-recursively filtered signals are both input to a single array of non-linear filters, the output of which being a signal multiplexed between the filtered recursive signal, and the filtered non-recursive signal.

13. Video processing apparatus comprising a filter structure serving to divide an input video signal into at least two high frequency bands; at least one recursive loop providing for the recursive combination in each band of spatially co-sited information from different temporal samples; a non-linear processor operating on a non-recursive signal in each band and a combiner serving to generate through parameterised combination of input video signal, recursively combined video signal and non-linearly processed signal, both a noise reduced signal for the or each recursive loop and a noise corrected signal for output.

14. Apparatus according to claim 13, wherein the parameters of said combination vary as between the spatial frequency bands.

15. Apparatus according to claim 13, wherein the combiner serves to generate a detail correction signal and a noise signal, the noise reduced signal being formed by subtraction of the noise signal from the input signal and the noise corrected signal being formed by weighted linear combination of the detail correction signal, the noise signal and the input signal.

16. Apparatus according to claim 15, wherein the weighting coefficients applied respectively to the detail correction signal, the noise signal and the input signal vary as between the bands.

17. Apparatus according to claim 13, wherein the characteristic of said non-linear processor varies between the bands.

18. Apparatus according to claim 13, wherein the recursive combination varies as between bands.

19. Apparatus according to claim 13, wherein the non-linear processor serves to pass differentially low amplitude signals expected to contain noise.

20. Apparatus according to claim 13, wherein the recursive loop is motion adapted.

21. Apparatus according to claim 13, wherein the recursive loop is motion compensated.

22. A video process comprising the steps of dividing an input video signal into at least two high frequency bands; deriving for each band a recursively filtered signal and a non-recursively filtered signal; combining the input video signal, the recursively filtered signal and the non-recursively filtered signal to derive separate noise reduced and noise corrected signals; utilizing the noise reduced signal in said recursive filtering and outputting said noise corrected signal.

23. A process according to claim 22, wherein there is variation between frequency bands of at least one of: the recursion constant, the characteristic of the non-recursive filtering input video signal, the relative contributions of the recursively filtered signal, the non-recursively filtered signal and input video signal in the noise reduced signal and the relative contributions of the recursively filtered signal, the non-recursively filtered signal and input video signal in the noise corrected signal.

24. A process according to claim 22, comprising the further step of deriving a detail corrected signal and outputting a noise and detail corrected signal.

25. A process according to claim 24 wherein there is variation between frequency bands of the contribution of the detail corrected signal to the noise and detail corrected signal that is output.

* * * * *